United States Patent [19]

Vanderzee

[11] Patent Number: 4,715,915
[45] Date of Patent: Dec. 29, 1987

[54] LONGITUDINAL SEAM AND METHOD OF FORMING

[75] Inventor: Robert S. Vanderzee, Carlisle, Pa.

[73] Assignee: Carlisle Corporation, Cincinnati, Ohio

[21] Appl. No.: 875,943

[22] Filed: Jun. 19, 1986

[51] Int. Cl.[4] .............................................. B32B 31/00
[52] U.S. Cl. .................................... 156/182; 156/157; 156/192; 156/307.1; 156/308.6; 156/324; 242/59; 428/57; 428/906
[58] Field of Search ...................... 156/192, 307.1, 157, 156/324, 182, 308.6; 428/57, 906; 242/59

[56] References Cited

U.S. PATENT DOCUMENTS

| | | | |
|---|---|---|---|
| 219,182 | 9/1979 | Stearns . | |
| 1,778,307 | 10/1930 | Bowers et al. . | |
| 3,063,889 | 11/1962 | Staff | 156/324 |
| 3,068,137 | 12/1962 | Seubert | 156/324 |
| 3,166,458 | 1/1965 | Chinn et al. | 156/157 |
| 3,619,314 | 11/1971 | Ecureux . | |
| 3,769,136 | 10/1973 | Ospelt | 156/308.6 |
| 3,865,665 | 2/1975 | Marion . | |
| 4,337,112 | 6/1982 | Hollis . | |
| 4,379,114 | 4/1983 | Fujiki et al. . | |

Primary Examiner—John J. Gallagher
Attorney, Agent, or Firm—Wood, Herron & Evans

[57] ABSTRACT

A seam is described wherein two sheets of material are bonded together to form one unified sheet. Edges of each sheet are stepped so that one side of an edge has a stepped portion and the opposite has a planar or flat surface. The planar or stepped surfaces of the two edges are joined together to form a seam in such a manner that the thickness of the seam is no greater than one and one half times the thickness of the sheet material. This is preferably used to form a longitudinal seam in a roll of sheet material.

13 Claims, 10 Drawing Figures

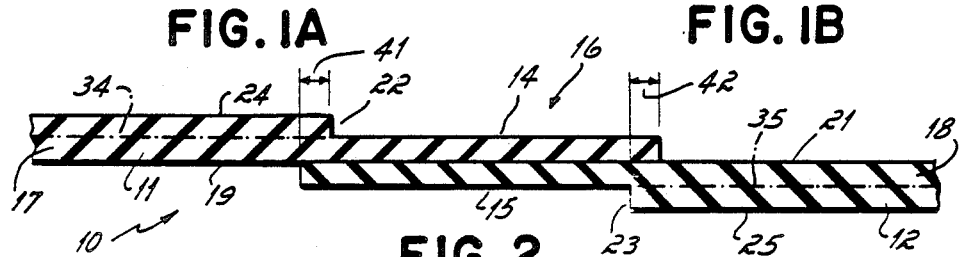
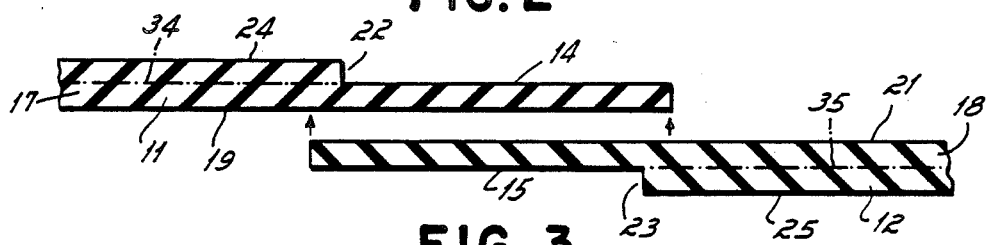
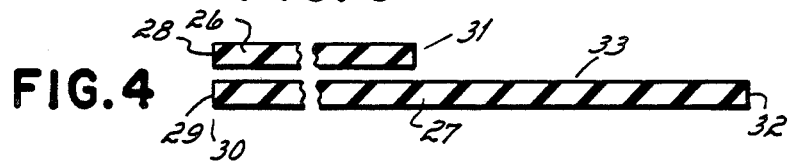
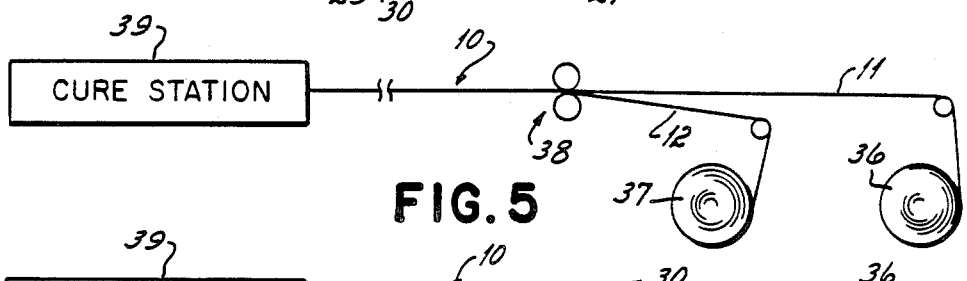
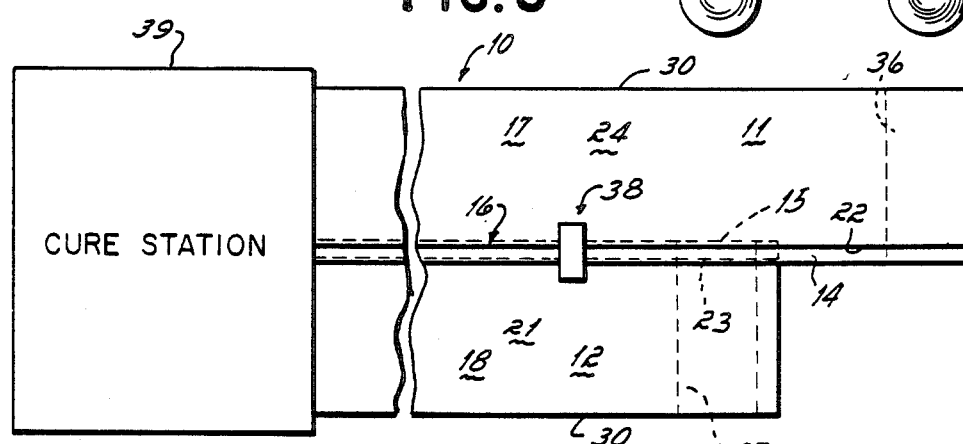

LONGITUDINAL SEAM AND METHOD OF FORMING

BACKGROUND

Elastomeric and plastic sheet material is formed by various methods including calendering, extrusion, drawing and the like. Due to the capital expense of the forming apparatus, the original width of plastic sheeting is relatively limited. Calender rolls or extrusion heads suitable to form for example 100 foot wide sheets of plastic materials are prohibitively expensive.

Calender rolls are typically 5 feet in width or less, although, a very few 10 foot wide calender rolls are now being used. This generally limits the width of formed sheet material, particularly formed rubber sheet material, to 5 feet. Many applications require substantially wider material. Roofing applications typically require 50 to 100 foot wide rolls.

A method of making very wide rubber sheeting is disclosed in Hollis U.S. Pat. No. 4,337,112. This patent discloses an apparatus for making an indefinite length composite sheet of very large predetermined width from indefinite length sheet stock having a relatively narrow width. According to this method, 5 foot wide sheet stock is rolled out, for example to 50 feet, and bonded to a second sheet along a horizontal edge to from a 50×10 foot wide sheet. This formed sheet is then advanced and another 50 foot long section is unwound and bonded to the 50×10 foot wide sheet to form a 50×15 foot sheet. This continues thereby forming a 50 feet wide sheet which is as long as desired. The sheet is then rolled up, cured and transported for use. Since the seams are parallel with the roll centerline, there is no problem with build up of material anywhere along the roll. This method is most efficient for particularly wide rolls, but becomes less and less advantageous as narrower width rolls such as 10 foot wide rolls are produced.

To form a sheet with a 10 foot width, a more economical method is to continuously, longitudinally join two 5 foot wide sheets forming a 10 foot wide sheet with a longitudinal seam down its centerline. Such a longitudinal seam is inherently preferred because there are fewer seams in a given sheet providing less waste and fewer cross seams for a roof installer to contend with. These cross seams represent an inherent weak point in all roof installations and often are the source of early failure. Longitudinal splices are also preferred because machinery can control seam overlap more accurately than with horizontal splicing.

Typically, a splice has a cross section as shown in FIG. 1A. The important thing to note with this seam is that it is twice the thickness of the normal sheet material. When such a sheet is rolled up, the double thickness of material creates a bulge in the roll.

An alternate embodiment of this seam is shown in FIG. 1B wherein two sheets are formed each having a stepped portion along opposed edges. These edges are joined to form a seam but the stepped portions do not overlap. The purpose of this seam is simply to reduce excess rubber, and therefore excess material cost in the seam area. This reduces the quantity of the material needed for such a wide seam, but still this prior art seam employs a double thickness of material and does not eliminate the problem of the bulge.

If sheets are longitudinally spliced using these well known splice constructions and an attempt is made to roll the sheet on round cores used to store and transport the sheet, an unacceptable bulge of material rapidly builds up at the center in the vacinity of the splice due to its double thickness thus making storage and transport impractical. U.S. Pat. No. 4,379,114 discloses a sheet bonding seam wherein two sheets with stepped portions are bonded together. As shown in FIG. 9, which is only briefly described in the patent, the half thick portion of one edge overlaps a full thick portion of another edge. However, the planar portion of the first edge does not bond to the planar portion of the second edge. This provides for a very uneven seam which is likely to fail or include pinholes. Accordingly, it is unsuitable for use in applications requiring a waterproof membrane, such as in roofing applications. The seam also has a thickness in excess of twice the thickness of the formed sheet material. Other references that disclose bonding sheet material together include Stearns U.S. Pat. No. 219,182 relating to a carpet lining, Ecureux U.S. Pat. No. 3,619,314 relating to a reinforced elastomeric sheet, and German Offen. 1,920,480 apparently relating to conveyor belts.

In roofing applications seams are formed from sheets with stepped edges. The edges are stepped to save material. There is no concerns with the thickness of the seam. Therefore, the seam includes areas where a full thickness portion of one edge overlaps a full thickness portion of a second edge.

SUMMARY OF THE INVENTION

The present invention is premised on the realization that a longitudinal seam of reduced thickness which does not cause a significant bulge in the center of a roll of longitudinally spliced material, can be formed by bonding two sheets together along common edges wherein each edge has a stepped cross sectional configuration, with one side flat or planar and the opposite side stepped. Preferably, the planar surfaces of the edges are bonded to each other to provide for a continuous seam which has a normal thickness of just equal to a single sheet thickness and a maximum thickness of one and a half times the thickness of either of the original sheets at each edge of the seam as insurance against possible half thickness being produced as a result of misplacement of the sheet during seaming. Due to the method of forming one planar surface bonded to a second planar surface, seam integrity is maintained.

The present invention is further premised on the realization that such a seam can be formed in a continuous manner by joining two thermosettable sheets together having preformed stepped edges by bringing the edges together and continuously advancing and compressing the edges to form a seam. The entire sheet is then passed through a continuous cure apparatus to cure the sheets thereby forming an unbreakable bond at the seam.

The seam formed according to the present invention is reliable because the small excess one and one half thickness portions allow forgiveness for seaming machine inaccuracies. Further, this seam reduces material costs. The reduction in seam thickness reduces bulging when formed sheets are rolled up with the seam perpendicular to the axis of the roll thus making this sheet construction practical for storage and transportation. The reduced seam thickness also permits formation of more reliable cross lap seams, i.e., when two of these seams cross when the formed sheet is used in for example a roof. Other details of the present invention, as well as the advantages, will be further appreciated in light of the following detailed description and drawings which:

BRIEF DESCRIPTION OF DRAWINGS

FIG. 1A is a cross sectional view of a prior art seam previously described;

FIG. 1B is a cross sectional view of a prior art seam previously described;

FIG. 2 is a cross sectional view of a seam made accordingly to the present invention;

FIG. 3 is an exploded diagramatic depiction of the seam shown in FIG. 2;

FIG. 4 is an exploded diagramatic depiction of a sheet for use in the present invention;

FIG. 5 is a side elevational view of a diagramatic depiction of an apparatus for use in manufacturing composite sheets in accordance with the present invention;

FIG. 6 is an overhead view of an apparatus for use in manufacturing sheet material with a longitudinal seam in accordance with the present invention.

DETAILED DESCRIPTION

Figure 7:
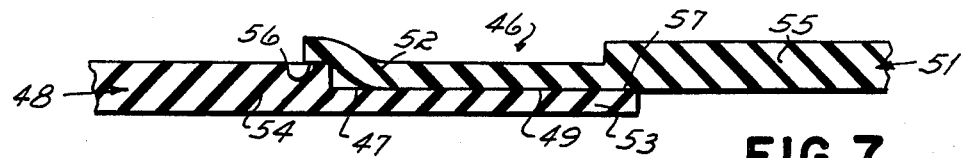
FIG. 7 is a cross sectional view of an alternate embodiment of the present invention.

According to the present invention a unitary enlarged sheet 10 is formed by bonding a first sheet 11 and second sheet 12 along longitudinal edges 14 and 15 respectively to form a longitudinal seam 16.

The sheets 11 and 12 each include full thickness body portions 17 and 18. The longitudinal edge portions 14 and 15 are thinner than portions 17 and 18 and preferably one-half the thickness of portions 17 and 18. These sheets 11 and 12 include planar sides 19 and 21 and sides which include a stepped portions 22 or 23. These sides are simply referred to a stepped sides 24 and 25.

Sheets 11 and 12 are identical and simply positioned relative to each other as shown in FIG. 3 to permit formation of seam 16. Although the sheets 11 and 12 can be formed by extrusion or continuous molding techniques, they are preferably formed by calendaring two separate laminae or plies and bonding the laminae together to form a composite sheet. This is particularly true where the sheets 11 and 12 are rubber sheets such as EPDM sheets. As shown in FIG. 4 the composite sheets 11 and 12 are formed from a first lamina 26 and a second lamina 27.

As seen in FIG. 4, the width of lamina 26 is less than the width of lamina 27. The sheets are bonded together by simply compressing the two lamina together as is typically done with EPDM sheeting. However, for purposes of this invention, the sheet 26 is aligned with sheet 27 so that a first edge 28 of sheet 26 is aligned directly above a first edge 29 of sheet 27 to form a full thickness longitudinal edge 30. Since the edge of sheet 26 is offset from the edge of 27, second edge 31 of sheet 26 is offset from second edge 32 of sheet 27. Therefore, a portion 33 of sheet 27 extends beyond the second edge 31 of sheet 26 providing for the stepped portions 22 and 23 of sheets 11 and 12.

If more than one sheet is to be bonded together to form for example a triple width sheet with two longitudinal seams, the edge portions 28 and 29 could be provided so that edge portion 28 extends beyond the edge portion 29 of sheet 27 to provide offset portions on both edges of the composite sheet with the two stepped portion on opposite sides of the sheet.

Since calendered sheets 26 and 27 are uncured mere introduction of an appropriate rubber solvent to the surfaces to be joined and compression of the sheets bonds the sheet 26 and 27 along a common boundry shown by ghost lines 34 and 35 of sheets 11 and 12.

The composite sheet, shown in FIG. 4, is preferably formed in a continuous manner by simply running the two lamina 26 and 27 disposed relative to each other as described through compression rollers. The EPDM sheeting is then collected on a roll preferably maintained separate by a separation sheet of paper or cloth (not shown) or mica dust as is typically done in this industry.

As shown in FIGS. 5 and 6 the unitary sheet 10 is formed by bonding sheets 11 and 12 at edges 14 and 15 to form seam 16. More particularly, a first roll 36 contains sheet material 11 and second roll 37 includes sheet material 12. The respective sheets 11 and 12 are unrolled from rolls 36 and 37 and run through a pair compression rollers 38. As shown in FIG. 6, the planar sides of sheets 11 and 12 are bonded together along their common longitudinal edges 14 and 15 to form the seam of the present invention. Compression rollers 38 bond the two sheets together along their common edges by compression to form seam 16.

The composite sheet material 10 is led from compression roller 38 to a cure station 39. The cure station can be any type of cure station typically used for EPDM sheeting. In the event the sheeting is not a thermosettable material, a cure station is not required. Suitable cure stations for thermosettable materials include continuous ovens, continuous cure electron beam or radiation apparatus. Alternately the sheet material 10 could be collected in rolls where the sheeting is separated from itself with a cloth or paper sheet or talc and subsequently cured in an autoclave.

These cure methods are all well known in the industry and form no part of the present invention except to the extent that a continuous cure method is preferred.

As shown in FIG. 2 the relative alignment of the edge portions 14 and 15 is significant. Edge portions 14 and 15 are generally 1½" wide. In order to form a seam which is both strong and impermeable, it is important to align the edge portions 14 and 15 so that these edge portions slightly overlap the full thickness portions 17 and 18 of the respective sheets. Thus at portions 41 and 42 of seam 16, the thickness of the material is equal to the thickness of an edge portion either 14 or 15 and a full body portion 17 or 18, i.e., is one and half times the thickness of the body portions 17 or 18. Portions 41 and 42 are preferably ⅛-¼" wide. This provides for a larger seal area and insures that no portion of the composite 10 is less than full thickness. If it was attempted to directly align the edge portions 14 and 15, alignment error would cause the seam to be only single lamina thick at portions and would provide a seam that was both weak and prone to pinholes and the like. Accordingly, it is preferred to have the edge portions 14 and 15 extend as at 41 and 42 onto the body portions 17 and 18 respectively.

In another alternative, using thermoset materials, adhesives can be employed to bond previously cured sheets thus enabling the formation of very wide sheets consisting of multiple widths of cured sheet, to form sheets far in excess of widths that can be cured with equipment of practical dimension.

Figure 8:
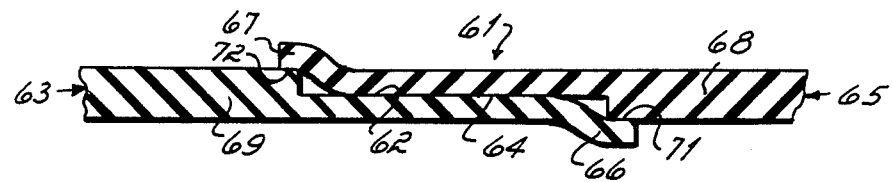
FIG. 8 is a cross sectional view of an alternate embodiment of the present invention.

FIGS. 7 and 8 show alternate embodiments of the present invention. As shown in FIG. 7, the seaming 46 is formed with stepped side 47 of sheet 48 bonded to planar side 49 of sheet 51. To avoid any half thickness seam portion, the half thickness portions 52 and 53 lap the full thickness portions 54 and 55 at 56 and 57 respectively.

As shown in FIG. 8, the seam 61 is formed with the stepped side 62 of sheet 63 bonded to the stepped side 64 of sheet 65. Again to avoid any half thickness seam, portion the half thickness portions 66 and 67 lap the full thickness portion 68 and 69 at 71 and 72.

With the embodiment shown in FIG. 7 and 8, the thickness of the seam is no greater than one and one-half the thickness of full thickness or body portion. This enables the formed sheet to be wound up in a roll win the seam being at the center of the roll while minimizing the bulge.

Figure 9:
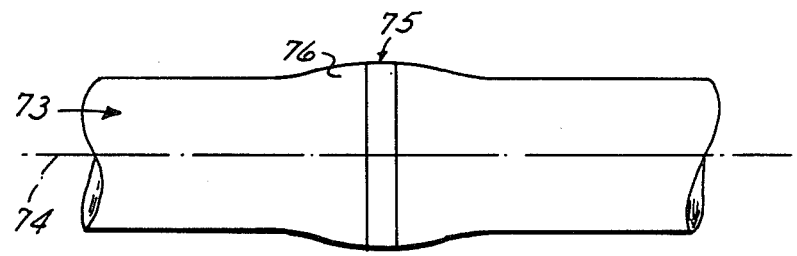
FIG. 9 is an elevational view of a roll of material incorporating the seam thereon in FIG. 2.

As shown in FIG. 9, the sheet material can be collected on a roll 73 which has a long axis 74. As rolled onto the roll, the seam 75 is perpendicular to the long axis of the roll. Although a bulge 76 forms, this is substantially smaller than any bulge which would be created if the seam were formed according to prior art methods. This allows a longer length of sheeting to be rolled onto roll 73 without creating an intolerable bulge.

This describes the preferred embodiment of the present invention as well as certain alternate embodiments. However, the limits of the present invention are defined only by the appended claims wherein I claim.

I claim:

1. A method of forming an enlarged sheet of material comprising;
    forming a first sheet by bonding together a first and a second lamina with said first lamina extending beyond said second lamina along a longitudinal first edge to form an edge portion, a body portion, a first planar side and a first stepped side said body portion having a thickness greater than a thickness of said edge portion;
    forming a second sheet by bonding together a first and a second lamina with said first lamina extending beyond said second lamina along a longitudinal second edge of said second lamina to form an edge portion, a body portion, a second planar side, and a second stepped side;
    bonding said first edge portion of said first sheet to said second edge portion of said second sheet with said first planar surface positioned and bonded to said second planar surface thereby forming a seam;
    said first and second edge portions overlapped to a controlled degree to provide a seam having a greatest thickness 1½ times the thickness of said body portion of said first sheet.

2. The method claimed in claim 1 comprising bonding said first sheet to said second sheet by compressing said sheets together along said first and second edge portions.

3. The method claimed in claim 2 wherein said sheets are uncured thermosettable plastic and said method further comprises curing said sheets and said seam.

4. The method claimed in claim 3 wherein said first edge portion is positioned beyond the second edge portion.

5. The method claimed in claim 4 wherein the second edge portion is positioned beyond the first edge portion.

6. The method claimed in claim 3 further comprising rolling up said enlarged sheet on a roll having a long axis with said seam being perpendicular to said axis.

7. A seam comprising a first edge of a first sheet bonded to a second edge of a second sheet;
    said first sheet comprising a body portion having a thickness and said first edge;
    said first edge comprising a planar side and a stepped side, said first edge having a thickness less than the thickness of said body portion;
    said second sheet comprising a body portion having a thickness and said second edge;
    said second edge including a planar side and a stepped side, said second edge having a thickness less than the thickness of said body portion;
    wherein said planar side of said first edge is bonded to the planar side of said second edge and said body portion of said first sheet is not bonded to the body portion of said second sheet.

8. The seam claimed in claim 1 wherein said edge of said first sheet extends beyond the edge of said second sheet.

9. The seam claimed in claim 8 wherein the edge of said second sheet extends beyond the edge of the first sheet.

10. A seam consisting essentially of a first edge of a first sheet bonded to a second edge of a second sheet wherein said first edge comprises a half thickness portion and said first sheet includes a first full thickness portion and said second edge comprises a half thickness portion and said second sheet includes a second full thickness portion wherein said half thickness portion of said first edge laps said half thickness portion of said second edge and said second full thickness portion to form said seams and wherein the total thickness of said seam is less than the combined thickness of said first and second full thickness portions.

11. The seam claimed in claim 10 wherein said first edge includes a planar side and a stepped side and said second edge includes a planar side and a stepped side wherein said planar side of said first edge is bonded to the stepped side of said second edge.

12. The seam claimed in claim 10 wherein said first edge includes a planar side and a stepped side and said second edge includes a planar side and a stepped side wherein said stepped side of said first edge is bonded to the stepped side of said second edge.

13. A roll of sheet material having a long axis, said sheet material having a seam perpendicular to said axis wherein said seam comprises the seam claimed in claim 10.

* * * * *